(12) United States Patent
Mabuchi

(10) Patent No.: US 6,342,740 B1
(45) Date of Patent: Jan. 29, 2002

(54) ARMATURE FOR A MINIATURE DC MOTOR

(75) Inventor: Takaichi Mabuchi, Matsudo (JP)

(73) Assignee: Mabuchi Motor Co., Ltd., Matsudo (JP)

(*) Notice: Subject to any disclaimer, the term of this patent is extended or adjusted under 35 U.S.C. 154(b) by 0 days.

(21) Appl. No.: 09/555,370

(22) PCT Filed: Oct. 28, 1999

(86) PCT No.: PCT/JP99/05960

§ 371 Date: May 30, 2000

§ 102(e) Date: May 30, 2000

(87) PCT Pub. No.: WO00/28643

PCT Pub. Date: May 18, 2000

(30) Foreign Application Priority Data

Nov. 6, 1998 (JP) .......... 10-331938
Nov. 17, 1998 (JP) .......... 10-343613
Mar. 10, 1999 (JP) .......... 11-062568

(51) Int. Cl.[7] .......... H02K 3/34; H02K 5/08
(52) U.S. Cl. .......... 310/40 MM; 310/214; 310/215
(58) Field of Search .......... 310/216, 261, 310/214–215, 260, 40 MM; 29/596–598

(56) References Cited

U.S. PATENT DOCUMENTS

| | | | |
|---|---|---|---|
| 4,663,865 A | 5/1987 | Caillier, Sr. .......... | 29/578 |
| 4,808,872 A | 2/1989 | Lund et al. .......... | 310/215 |
| 5,363,002 A | * 11/1994 | Hernden et al. .......... | 310/54 |
| 5,428,258 A | * 6/1995 | Mowery .......... | 310/215 |
| 5,670,931 A | * 9/1997 | Besser et al. .......... | 340/310.01 |
| 5,861,792 A | * 1/1999 | Ueda et al. .......... | 336/234 |

FOREIGN PATENT DOCUMENTS

| | | |
|---|---|---|
| JP | 31-12529 | 8/1956 |
| JP | 31-7964 | 9/1956 |
| JP | 48-441 | 1/1973 |
| JP | 51-144901 | 12/1976 |
| JP | 2-26358 | 2/1990 |
| JP | 2-60475 | 5/1990 |
| JP | 5-70150 | 9/1993 |
| JP | 6-26042 | 7/1994 |
| JP | 52-42201 | 4/1997 |
| JP | 9-121493 | 5/1997 |
| JP | 2807534 | 7/1998 |

* cited by examiner

Primary Examiner—Tran Nguyen
(74) Attorney, Agent, or Firm—Armstrong, Westerman, Hattori, McLeland & Naughton, LLP

(57) ABSTRACT

An armature (11) for a miniature DC motor constitutes a rotor provided in an interior of a casing and armature windings (10) are wound around an iron core (9) in the form of a coil. In this armature (11), insulators (25, 26) made of paper including at least ordinary paper and having an electric insulation property adhere to at least portions, of both end faces of the iron core (9), on which the armature windings are wound. Thus, the iron core and the armature windings do not come into direct contact with each other.

12 Claims, 4 Drawing Sheets

(A)

(B)

(A)

(B)

(C)

ARMATURE FOR A MINIATURE DC MOTOR

TECHNICAL FIELD

The present invention relates to an armature for a miniature direct current motor (hereinafter simply referred to as a miniature motor). More particularly, it relates to an armature for a miniature DC motor which may enhance the motor characteristics by keeping an insulation performance between an iron core and armature windings at low cost.

BACKGROUND ART

A miniature motor has been extensively used in a wide field including a variety of equipments. There is a demand of the improvement in a heat resistance, machining workability, assembling workability or the like in addition to the reduction at cost and the enhancement of the motor characteristics.

In an armature to constitute a rotor which is provided in an interior of the miniature motor, armature windings (hereinafter referred to as windings) are wound around an iron core in the form of a coil. In order to insulating the iron core and the windings from each other, there are a variety of approaches.

For instance, there is one case in which epoxy resin coating, or the like, is applied to the iron core or there is another case in which the iron core is covered with a sheet or a molding material made of resin formed in conformity with a shape of the iron core (see Japanese Utility Model Application Laid-Open No. Hei 2-60475, Japanese Patent Examined Publication No. Sho 31-7964 and Japanese Utility Model Application Laid-Open No. Hei 5-70150).

By the way, in the armature, since the windings are wound on the iron core, it is likely that an insulation failure would occur at edge portions of both end faces of the iron core. In the case in which the above-described coating is applied in order to avoid this insulation failure, it is difficult that the coating material adheres to the edge portions which most need the insulation performance.

When the coating becomes thick for this reason, internal spaces of the iron core for winding the wire become small. As a result, there is a fear that a winding number of the possible windings becomes small and there is a fear that the characteristics of the motor would be degraded.

Also, when the coating material is sprayed, the coating is applied to portions which do not need the coating. In order to perform the coating which is thin with a high reliability in order not to reduce the winding number of the windings, a high technology equipment and a high technology are necessary.

On the other hand, in the case in which the iron core is covered with the above-described sheet or molding which is made of resin, a predetermined thickness is needed to some extent in view of the molding technology. As a result, the internal spaces become small so that the winding number is decreased and it is difficult to thin the miniature motor.

A heat resistance temperature of the resin which is the material for the sheet or the like is low in a range of about 120° to 180° C. Also there is a fear that the sheet is offset. In addition, when the sheet or the like is produced, scrap materials are by-products, accordingly there is a fear that an environmental problem is lead.

Japanese Utility Model Examined Publication No. Sho 31-12529 and Japanese Patent No. 2807534, and the like, disclose an arrangement in which insulators made of paper are provided on the iron core. However, these technologies are not directed to a heat resistance, a machining workability and an assembling workability. Also, these technologies are not directed to an arrangement for preventing an insulation failure at the edge portions by providing insulators at both end faces of the iron core.

In order to overcome the above-noted difficulties, an object of the present invention is to provide an armature for a miniature DC motor which may enhance the characteristics of the motor by keeping an insulation performance between an iron core and armature windings at low cost. Also, another object of the present invention is to elevate a heat resistance temperature of the armature.

DISCLOSURE OF THE INVENTION

An armature for a miniature DC motor, according to the present invention, constitutes a rotor provided in an interior of a casing of the miniature DC motor, windings of the armature being wound around an iron core in the form of a coil, wherein insulators, which are made of paper including at least ordinary paper and have an electric insulation property, adhere to at least portions, of both end faces of the iron core, on which the armature windings are wound so that the iron core and the armature windings do not come into direct contact with each other.

It is preferable that the insulators are either an impregnated paper in which a substance having a waterproof effect is impregnated with an ordinary paper or a laminated paper in which an ordinary paper and a thin plate made of resin are laminated to each other.

Incidentally, an armature for a miniature DC motor constitutes a rotor provided in an interior of a casing of the miniature DC motor, windings of the armature being wound around an iron core in the form of a coil, wherein insulators made of paper composed of a vulcanized fiber may adhere to at least portions, of both end faces of the iron core, on which the armature windings are wound so that the iron core and the armature windings do not come into direct contact with each other.

Also, an armature for a miniature DC motor constitutes a rotor provided in an interior of a casing of the miniature DC motor, windings of the armature being wound around an iron core in the form of a coil, wherein insulators made of soft resin film may adhere to at least portions, of both end faces of the iron core, on which the armature windings are wound so that the iron core and the armature windings do not come into direct contact with each other.

In this case, it is preferable that a material of the soft resin film is selected from a group consisting of polyester synthetic resin, low-density polyethylene, high-density polyethylene, polyamide, polypropylene, polyvinyl chloride and polyvinylidene chloride.

In the armature, it is preferable that, under a condition that the insulators are bent from edge portions of both the end faces of the iron core toward internal spaces, the armature windings are wound around the iron core through the insulators.

Incidentally, in the armature, the insulators may be made of thick paper and have substantially the same shape as that of the end faces at the portions of both the end faces of the iron core or have such a shape in order that the insulators somewhat project from the edge portions of respective end faces of arm portions and anchor portions of the iron core.

BRIEF DESCRIPTION OF THE DRAWINGS

FIG. 1 is a frontal view in cross section of one side of a miniature DC motor.

FIG. 2 is an exploded perspective view showing a structure of an armature according to the present invention.

FIG. 3 is a perspective view showing the armature in which insulators are provided to an iron core.

FIGS. 4A–B is illustrations showing the insulators attached on a release coated paper.

FIGS. 5A–C is cross-sectional views taken along a line V—V of FIG. 3.

BEST MODE FOR EMBODYING THE INVENTION

An example of an embodiment of the present invention will now be described with reference to FIGS. 1 to 5.

Figure 1:
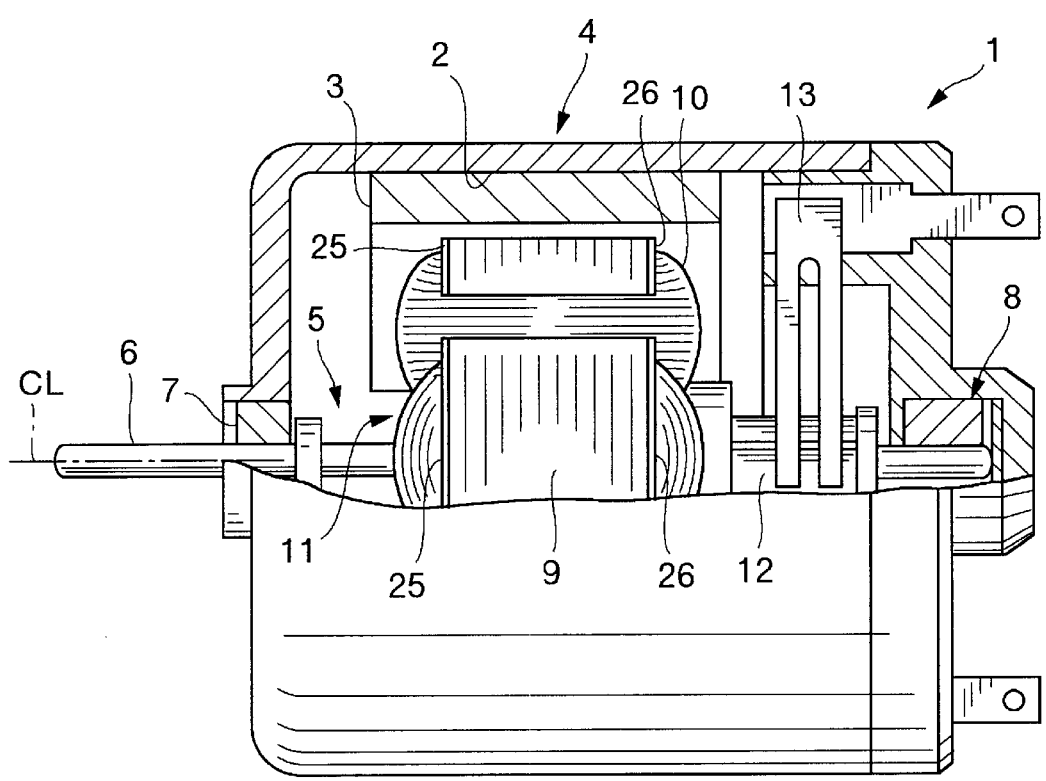
FIGS. 1 to 5 show an example of an embodiment of the present invention.
Figure 2:
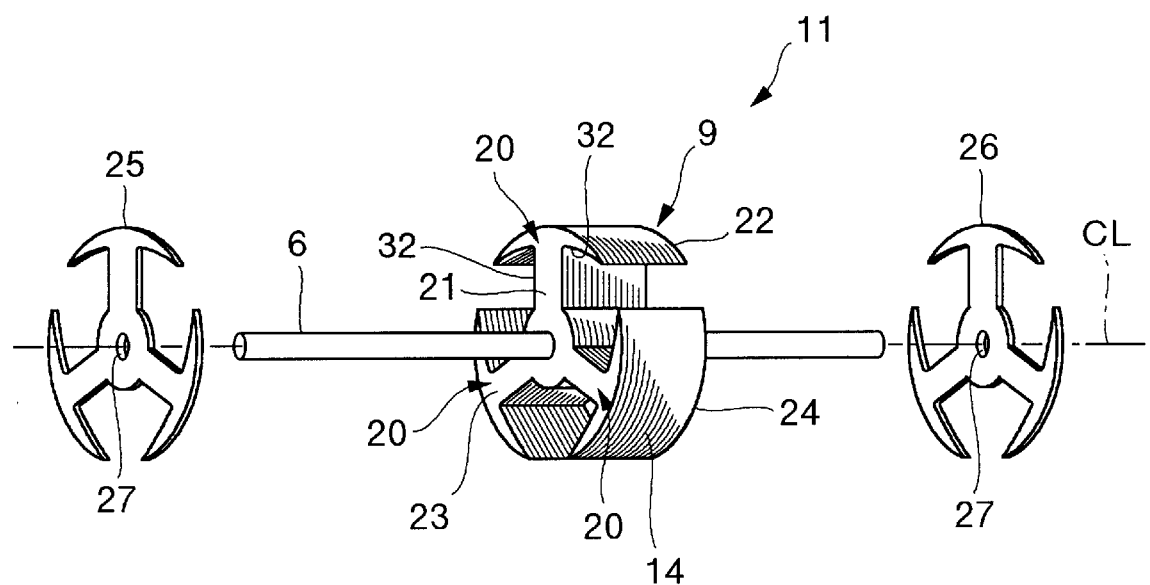
Figure 3:
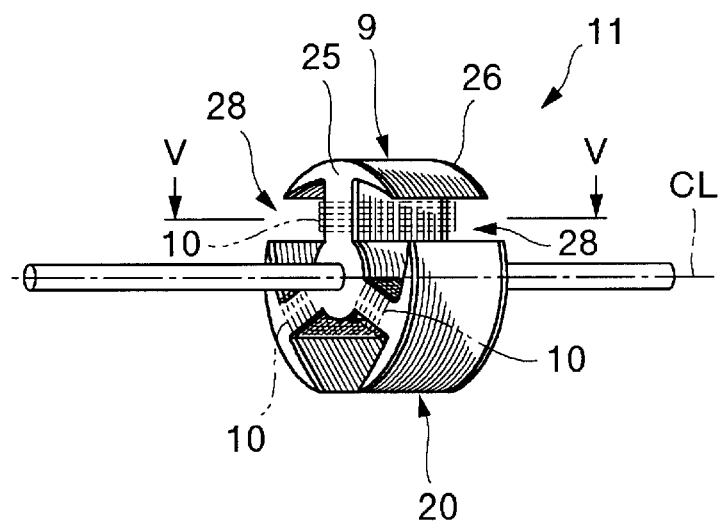
Figure 4:
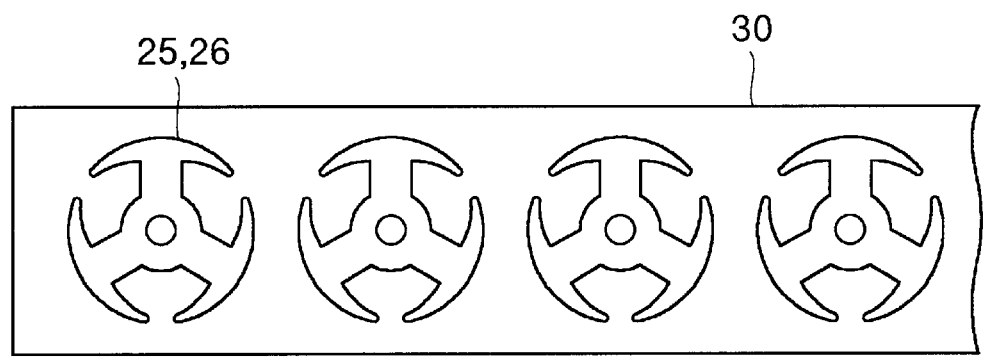
Figure 4:
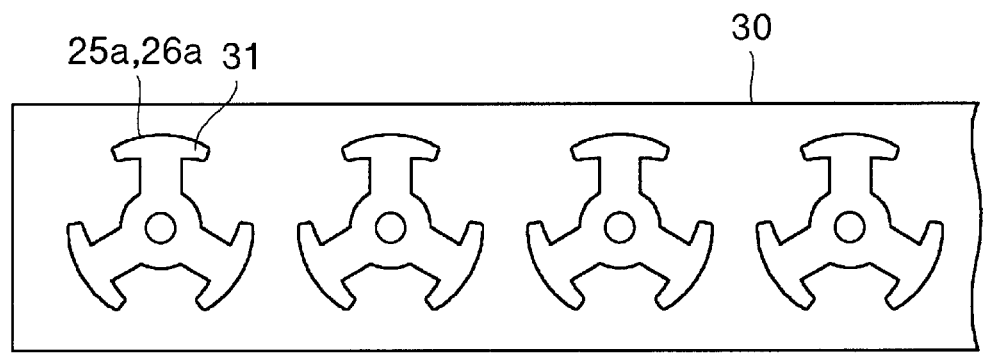
Figure 5:
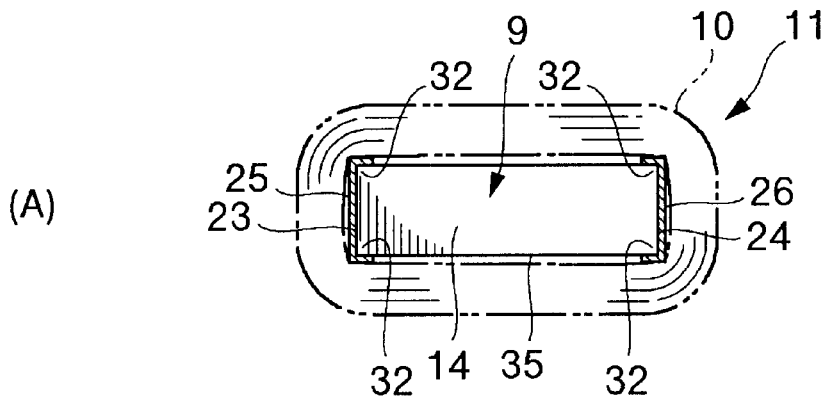
Figure 5:
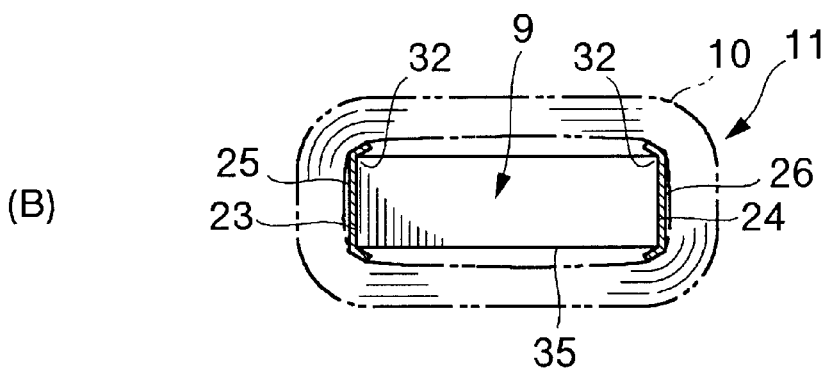
Figure 5:
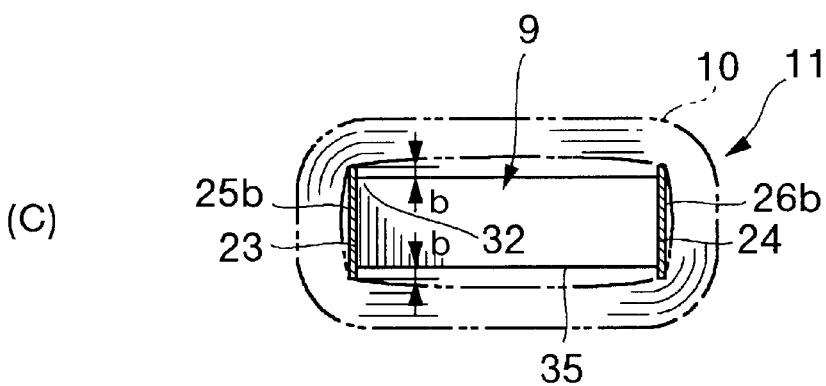

FIG. 1 is a frontal view in cross section of one side of a miniature DC motor having an armature according to the present invention. FIG. 2 is an exploded perspective view of the armature. FIG. 3 is a perspective view showing the armature in which insulators are provided to an iron core. FIG. 4 is illustrations showing the insulators attached on a release coated paper. FIG. 5 is cross-sectional views taken along a line V—V of FIG. 3.

As show n in FIG. 1, the miniature motor (miniature DC motor) 1 is provided with a casing 4 in which a stator 3 is mounted on an inner surface 2 of the casing 4, and a rotor 5 mounted in an interior of the casing 4. A rotary shaft 6 of the rotor 5 is rotatably support ed to bearing portions 7 and 8 provided to the casing 4.

The rotor 5 is provided with the rotary shaft 6, an armature 11 and a commutator 12. The rotary shaft 6 extends in a direction of a centerline CL which is to be a rotary center. In the armature 11, windings (armature windings) 10 are wound around an iron core 9 mounted on the rotary shaft 6 in the form of a coil. The commutator 12 is mounted on the rotary shaft 6 and is electrically connected to the windings 10. Brushes 13 mounted on the casing 4 are slidingly engaged with the commutator 12.

As shown in FIGS. 2 and 3, the iron core 9 of the armature 11 is called a multilayer core, and the iron core 9 is formed by laminating a plurality of thin plate type core elements 14. The iron core 9 is provided with a plurality (for example, three) of salient poles 20.

Each salient pole 20 is provided with an arm portion 21 extending radially outwardly and an anchor portion 22 extending in a circumferential direction on both sides from a tip end portion of the arm portion 21. The windings 10 are mainly wound around the arm portions 21. The rotary shaft 6 is fixedly inserted in a central portion of the iron core 9.

Insulators 25 and 26 having an electric insulation property adhere with adhesives to at least portions, of both end faces 23 and 24 of the iron core 9, on which the windings 10 are wound. That is the reason why the iron core 9 and the armature windings 10 do not come into direct contact with each other.

Paper material including at least ordinary paper or paper material composed of vulcanized fiber is used for the insulators 25 and 26. The insulators 25 and 26 are for example formed into thin plates, made of ordinary paper, having shapes corresponding to the shapes of the end faces 23 and 24.

One insulator 25 is mounted on one end face 23 and the other insulator 26 is mounted on the other end face 24, respectively. Holes 27 for allowing the rotary shaft 6 to pass therethrough are formed in the central portions of the insulators 25 and 26.

The windings 10 are wound in the form of a coil around the arm portions 21 and the anchor portions 22 of the three salient poles 20 under the condition that the insulators 25 and 26 are brought into intimate contact with both the end faces 23 and 24 of the iron core 9 to thereby assemble the armature 11.

Almost all of the windings 10 are wound around the arm portions 21 and simultaneously the windings 10 are also wound around the anchor portions 22. Almost all of the windings 10 are received in internal spaces 28 defined between the adjacent salient poles 20 and 20 of the iron core 9.

In the insulators 25 and 26 shown in FIGS. 2 and 3, the holes 27 for allowing the rotary shaft 6 to be inserted therethrough are round in shape. Incidentally, it is preferable that a recess is formed in the position of the hole 27 of the insulators 25 and 26 so that a projection (not shown) of the commutator 12 may engage with the recess.

With such an arrangement, the commutator 12 is brought into intimate contact with the insulator and at the same time, the projection of the commutator 12 is engaged with the recess of the insulator so that the commutator 12 is fixedly positioned to the armature 11.

The reason why the recess is formed in the insulator is as follows. Namely, in the case in which the recess is also formed in a position of a hole through which the rotary shaft is inserted in the iron core, magnetic lines of force which are generated from a magnetic field formed by permanent magnets and which pass through the iron core are decreased to thereby reduce a torque of the motor. Accordingly, it is preferable that the recess is formed only in the insulator but not in the iron core.

The material for the insulators 25 and 26 may be selected from ordinary paper such as fine quality paper or reproduced paper, paper (impregnated paper) in which a substance having a waterproof effect is impregnated with an ordinary paper, a paper (laminated paper) in which the ordinary paper and a thin plate made of resin are laminated on each other, the paper made of vulcanized fiber, and the like.

Normally, in the case in which the paper adheres to the iron core, there would be no problem under high moisture circumstances to some extent. However, in the case in which the moisture-proof is the important factor, it is preferable to use the impregnated paper in which the substance having the waterproof effect is impregnated with the ordinary paper. The above-described substance having the waterproof effect may be at least one selected from a group of resin, wax and oil.

Since the impregnated paper and the laminated paper are made of resin or the like as basic material, it is possible to prevent an expansion due to a water absorption. This prevention of the expansion due to the water absorption means to prevent the insulators from expanding to cause an adverse affect such as the contact with other parts. Also, the impregnated paper and the laminated paper are superior in bendability and elongation property.

For instance, when an acrylic resin is used as basic material for such the impregnated paper and the laminated paper, the acrylic resin is superior particularly in bendability and elongation property. As a result, it is possible to easily mount, on the iron core 9, the insulators 25 and 26 which are formed into a predetermined shape. Accordingly, it is easy to perform an assembling work of the armature 11.

The vulcanized fiber is the paper manufactured through a predetermined process. This predetermined process is as follows. The fiber original paper manufactured from material such as a selected chemical pulp or a cotton fiber is processed with zinc chloride solution and is partially cured and then is rolled up, and thereafter it is subjected to water washing, drying, pressing, polishing and the like.

There are many kinds of vulcanized fiber. It is normal that the vulcanized fiber has a moisture content of 6 to 10% and has the water absorption and hygroscopicity. It is preferable for material of the vulcanized fiber that the material has low water absorption and hygroscopicity in order to suppress or prevent the deformation of the shape thereof, because the extent of the shrinkage and expansion of the material due to the drying and moisture absorption is suppressed.

Since the vulcanized fiber is superior in electric insulation property, it is possible to positively ensure the insulation between the iron core 9 and the windings 10 at low cost. Also, a formation of the vulcanized fiber is dense and strong. Accordingly, there is no fear that the vulcanized fiber would be broken when it is to be applied to the iron core 9. The assembling work of the armature 11 is facilitated.

Also, in some cases, a thickness of the insulators 25 and 26 is thin or somewhat thick. In view of the workability when the paper is mounted on the iron core 9, it is preferable that the paper for the insulators 25 and 26 is a long fibrous paper having the elongation property. A fiber length of the long fibrous paper is, for example, in a range of 90 to 135 $\mu$m.

It is possible to use a soft resin film for the insulators 25 and 26 instead of the one made of paper. The material for this soft resin film may be selected from, for example, polyester synthetic resin such as polyethylene terephthalate, low-density polyethylene (LDPE), high-density polyethylene (HDPE), polyamide, polypropylene, polyvinyl chloride, polyvinylidene chloride, and the like.

The adhesive is applied to either one or both of the insulators and the iron core 9, accordingly the insulators 25 and 26 adhere to the iron core 9 with the adhesive. It is preferable that this adhesive is the material which has a heat resistance and the waterproof property. For instance, when an acrylic adhesive is used, since it has the heat resistance and a good adhesiveness, the bonded insulators may be prevented from being peeled and an offset of the insulators may be prevented. As a result, it is easy to perform the assembling work of the armature 11.

For example, as shown in FIG. 4(A), the ordinary paper, the impregnated paper, the laminated paper, the vulcanized fiber or the soft resin film for using as the insulators 25 and 26 is formed into a predetermined shape and simultaneously the adhesive is applied to one surface of the insulators. A plurality of pieces of the insulators are attached on a release coated paper 30 in the form of a sheet. Under this condition, when the release coated paper 30 is provided to a process for assembling the armature 11, it is possible to enhance the efficiency of the mounting work of the insulators 25 and 26.

Some of the above-described material and thickness are used suitably in combination for the insulators 25 and 26, and the insulators are mounted on the iron core 9. The insulators may be provided to portions, of both the end faces 23 and 24 of the iron core 9, on which the windings 10 are to be wound. Namely, it is not always necessary to cover entire portions between both end faces of the anchor portions 22 of the salient poles 20 with the insulators.

Accordingly, for instance, as shown in FIG. 4(B), it is possible to use insulators 25a and 26a in which outer portions 31 corresponding to the anchor portions 22 are formed into a relatively small size. The adhesive is applied to the plurality of insulators 25a and 26a and the insulators 25a and 26a are attached on the release coated paper 30.

As shown in FIGS. 5(A) and (B), the insulators 25 and 26 are bent from edge portions 32 of both the end faces 23 and 24 of the iron core 9 toward the internal spaces 28 (FIG. 3). Under this condition, the windings 10 are wound around the iron core 9 through the insulators 25 and 26.

In FIG. 5(A), since the insulators 25 and 26 are thin, there is shown a state in which the insulators 25 and 26 are bent along the iron core 9 at the edge portions 32. In FIG. 5(B), the impregnated paper, the laminated paper or the vulcanized fiber which has a somewhat large thickness is used as the insulators 25 and 26. Then, the impregnated paper or the like is heated at the edge portions 32 by a soldering tool or the like to obtain a shape of the insulators bent somewhat toward the internal spaces 28.

Since a plurality of core elements 14 which constitute the iron core 9 are formed by punching-out with a press machine, there is a case in which the cut face by the punching-out would be rough. For this reason, when the windings 10 are brought into direct contact with the iron core 9 at each edge portions 32 between the anchor portions 22 and the arm portions 21 of the iron core 9, there is a fear that the windings 10 are abraded by the edge portions 32 so that an insulation coating of the windings 10 would be removed. As a result, there is an insulation failure and an electric leak.

Therefore, according to this embodiment, both the end faces 23 and 24 of the iron core 9 and the edge portions 32 thereof are covered with the insulators 25 and 26. Accordingly, there is almost no fear that the windings 10 and the iron core 9 would come into direct contact with each other, and the insulation performance between the iron core 9 and the windings 10 may be ensured.

In the case in which the insulators are made of soft resin film, since the insulators are softer than the paper, the insulators may readily be bent from the edge portions 32 of the iron core 9 toward the internal spaces 28 and may be extended longitudinally along the side surfaces 35 on both sides and may adhere thereto. Thus, the insulators cover almost all of the side surfaces 35 to further ensure the insulation performance in good condition.

Incidentally, in a case in which the insulators 25 and 26 are thin, it is preferable that a plurality of insulators are overlapped and used in place. Even if these insulators would be broken on the side of the iron core 9, there is no fear that the insulation failure would occur.

Also, in an example shown in FIG. 5(C), the insulators 25b and 26b are made of thick paper. The insulators 25b and 26b have substantially the same shape as that of the end faces 23 and 24 at the portion, of both the end faces 23 and 24 of the iron core 9, on which the windings 10 are wound. Alternatively, the insulators 25b and 26b have such a shape in order that they may project somewhat (for example, by a predetermined dimension b) from the edge portions 32 of respective end faces of the anchor portions 22 and the arm portions 21 of the iron core 9.

With such an arrangement, it is possible to ensure the same working effect as that described according to FIGS. 5(A) and (B). In addition to this, in comparison with the case shown in FIG. 5(B), since a process for bending the insulators is dispensed with, the assembling work may be simplified.

As described above, according to the present invention, the insulators 25, 25a, 25b, 26, 26a and 26b adhere to at least portions, of both the end faces 23 and 24 of the iron core 9, on which the windings 10 are wound so that the iron core 9 and the windings 10 do not come into direct contact with each other. The insulators are formed out of the paper or the soft resin film having the electric insulation property.

Thus, it is possible to keep the insulation performance between the iron core 9 and the windings 10 at low cost to thereby enhance the characteristics of the miniature motor 1.

In the above-described embodiment, the edge portions 32 of the iron core, on which the possibility that the electric leak due to the insulation failure occurs is highest, are covered by the insulators 25, 25a, 25b, 26, 26a and 26b so that the windings 10 are prevented from coming into direct contact with the edge portions 32 of the iron core.

Thus, it is possible to prevent the insulation coating of the windings 10 from being removed at the iron core edge portions 32. As a result, there is no fear that the insulation failure would be caused. Accordingly, it is possible to prevent the electric leak by keeping the insulation performance between the iron core 9 and the windings 10 to thereby enhance the characteristics of the miniature motor 1.

When the insulators made of paper including at least ordinary paper are used, since a carbonizing temperature of the ordinary paper is about 700° C., it is possible to keep high a heat resistance temperature of the armature 11 for the miniature motor 1 at low cost. In particular, in the case in which the ordinary paper is independently used as the insulators, the heat resistance is enhanced.

On the other hand, as shown in FIG. 5(B), in the case in which the insulators 25 and 26 are bent, since it is difficult to perform these bending works with only the ordinary paper, it is possible to perform the bending work and the drawing work when the impregnated paper or the laminated paper is used. Thus, it is possible to readily mount on the iron core 9 the insulators 25 and 26 formed in a predetermined shape to thereby improve an assembling workability of the armature 11.

It is preferable that the insulators are thin as much as possible because a rate (winding occupying rate) for the windings 10 to occupy the internal spaces 28 of the iron core 9 is increased and in order to increase the winding number for the possible winding. However, when the insulators are thin, they are softened so that a rigidity of the insulators would be weak. Then, in the winding work of the windings 10, there is a fear that wrapping of the insulators or peeling thereof would occur.

Therefore, in the embodiment, the insulators 25, 25a, 25b, 26, 26a and 26b adhere to the iron core 9 with adhesives. Thus, it is possible to prevent these troubles and to aim the enhancement of the efficiency of the winding work. When once the windings 10 are wound, since the insulators are depressed by the windings 10, there is no serious problem in the heat resistance in adhesives thereafter.

Also, since the insulators may be thinned, the internal spaces 28 become large. It is therefore possible to increase the winding number for the possible windings and to enhance the characteristics of the motor to readily thin the motor.

When the paper including the ordinary paper having the heat resistance is used as the insulators, it is possible to enhance the heat resistance temperature of the armature at low cost. In the case in which the impregnated paper or the laminated paper is used as the insulators, it is possible to enhance a moldability (i.e., workability) of the insulators and the assembling workability of the armature in addition to the enhancement of the heat resistance.

In the case in which the vulcanized fiber is used as the insulators, it is possible to positively ensure the insulation performance in addition to the enhancement of the heat resistance temperature. Also, in this case, it is possible to enhance the assembling workability of the armature since the insulators would hardly be broken.

Also, when the insulators are made of paper, there is almost no problem in environmental aspects, and there is no disadvantage in the case in which the coating material is used.

In the case in which the soft resin film is used as the insulators, the film is softer than the paper and is weak in restoring force. Accordingly, the insulators may readily be bent at the edge portions of the iron core and may be mounted thereon. It is possible to readily perform the assembling work even for the armature for a miniature size motor.

With the above-described arrangement according to the present invention, it is possible to enhance the characteristics of the motor by ensuring the insulation performance between the iron core and the armature windings of the miniature DC motor at low cost.

Also, when the insulators made of paper insulate between the iron core and the armature windings, it is possible to elevate the heat resistance temperature of the armature in addition to the above-described effect.

Incidentally, the same reference numerals in each drawing represent the same or corresponding portions.

INDUSTRIAL APPLICABILITY

As described above in detail, the armature for the miniature DC motor according to the present invention is suitably applied to the armature installed in the miniature motor which is used in an optical precision equipment such as a miniature camera, an audio visual equipment such as a CD (Compact disk) player, an OA (Office automation) equipment such as a copying machine, a home electric appliance such as a hair drier, an automotive electric equipment, a toy and the like.

What is claimed is:

1. An armature for a miniature DC motor for constituting a rotor provided in an interior of a casing of said miniature DC motor, said armature comprising:

an iron core; and armature windings wound around said iron core in the form of a coil, wherein said armature windings are wound on insulators made of paper, said insulators having an electric insulation property, and adhered to at least portions of both end faces of said iron core so that said iron core and said armature windings do not come into direct contact with each other.

2. The armature for a miniature DC motor according to claim 1, wherein said paper is independently used as said insulators to thereby enhance a heat resistance.

3. The armature for a miniature DC motor according to claim 1, wherein said insulators comprise one of an impregnated paper in which a substance having a waterproof effect, said substance being at least one selected form a group of resin, wax and oil, is impregnated in a paper or a laminated paper having a fiber paper and a resin plate are laminated to each other.

4. The armature for a miniature DC motor according to claim 3, wherein an acrylic resin is used as a basic material for said impregnated paper and said laminated paper.

5. The armature for a miniature DC motor according to any one of claims 1, 2, 3 or 4, wherein said paper is a long fibrous paper having an elongation property with a fiber length in a range of 90 to 135 µm.

6. The armature for a miniature DC motor for constituting a rotor provided in an interior of a casing of said miniature DC motor, said armature comprising:

an iron core; and armature windings wound around said iron core (9) in the form of a coil, wherein armature windings are wound on insulators made of paper composed of a vulcanized fiber adhered to at least portions of both end faces of said iron core so that said iron core and said armature windings do not come into direct contact with each other.

7. An armature for a miniature DC motor for constituting a rotor provided in an interior of a casing of said miniature DC motor, said armature comprising:

an iron core; and armature windings wound around said iron core in the form of a coil, wherein said armature windings are wound on insulators made of soft resin film adhered to at least portions of both end faces of said iron core so that said iron core and said armature windings do not come into direct contact with each other, wherein under a condition that said insulators are bent from edge portions of both the end faces of said iron core toward internal spaces, said armature windings are wound around said iron core through said insulators.

8. The armature for a miniature DC motor according to claim 7, wherein a material of the soft resin film is selected from a group consisting of polyester synthetic resin, low-density polyethylene, high-density polyethylene, polyamide, polypropylene, polyvinyl chloride and polyvinylidene chloride.

9. The armature for a miniature DC motor according to claim 1 or 6, wherein under a condition that said insulators are bent from edge portions of both the end faces of said iron core toward internal spaces, said armature windings are wound around said iron core through said insulators.

10. The armature for a miniature DC motor according to claim 1 or 6, wherein said insulators have substantially the same shape as that of the end faces at the portions of both the end faces of said iron core or have such a shape in order that said insulators project from the edge portions of respective end faces of arm portions and anchor portions of said iron core.

11. The armature for a miniature DC motor according to claim 1, 6 or 7, wherein an acrylic adhesive is applied to either one or both of said insulators and said iron core so that said insulators adhere to said iron core with said acrylic adhesive.

12. The armature for a miniature DC motor according to claim 1, 6 or 7, wherein a plurality of said insulators are overlapped and used in place so that an insulation failure is prevented even if said insulators would be broken on a side of said iron core.

* * * * *